(12) United States Patent
Ohtsuki (10) Patent No.: US 7,212,238 B2
(45) Date of Patent: May 1, 2007

(54) MAGNIFICATION ALTERATION PROCESSING METHOD WHICH ACCORDS WITH TYPES OF IMAGE DATA AND IMAGE PROCESSING APPARATUS WHICH USES THE METHOD

(75) Inventor: Hideki Ohtsuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 795 days.

(21) Appl. No.: 09/944,081

(22) Filed: Sep. 4, 2001

(65) Prior Publication Data
US 2002/0027615 A1 Mar. 7, 2002

(30) Foreign Application Priority Data
Sep. 4, 2000 (JP) ............................. 2000-267106
Sep. 5, 2000 (JP) ............................. 2000-269412
Mar. 6, 2001 (JP) ............................. 2001-062609

(51) Int. Cl.
H04N 5/225 (2006.01)
H04N 9/04 (2006.01)

(52) U.S. Cl. ............................. 348/240.99; 348/240.2; 348/561; 348/581

(58) Field of Classification Search ................ 348/561, 348/581, 717, 716, 718, 207.99, 207.2, 441, 348/240.99, 240.2; 345/660, 667, 670, 671, 345/3.4; 382/298–300
See application file for complete search history.

(56) References Cited

U.S. PATENT DOCUMENTS

| 4,725,892 | A | * | 2/1988 | Suzuki et al. ............... 382/299 |
| 4,833,625 | A | * | 5/1989 | Fisher et al. ................ 345/668 |
| 5,117,484 | A | * | 5/1992 | Nakagawa et al. ......... 345/603 |
| 5,172,103 | A | * | 12/1992 | Kita ........................... 345/667 |
| 5,343,238 | A | * | 8/1994 | Takata et al. ............... 348/556 |
| 5,502,580 | A | * | 3/1996 | Yoda et al. ................. 358/518 |
| 5,553,201 | A | * | 9/1996 | Muramatsu ................. 358/1.9 |
| 5,914,753 | A | * | 6/1999 | Donovan .................... 348/441 |
| 6,157,749 | A | * | 12/2000 | Miyake ...................... 382/300 |
| 6,407,778 | B1 | * | 6/2002 | Shimizu et al. ............. 348/581 |
| 6,411,305 | B1 | * | 6/2002 | Chui .......................... 345/660 |
| 6,515,678 | B1 | * | 2/2003 | Boger ........................ 345/660 |
| 6,549,214 | B1 | * | 4/2003 | Patel et al. ................. 345/660 |
| 6,654,026 | B2 | * | 11/2003 | Lee ............................ 345/600 |
| 6,810,155 | B1 | * | 10/2004 | Ting et al. ................. 382/300 |
| 2002/0018136 | A1 | * | 2/2002 | Kaji et al. ............. 348/333.02 |

FOREIGN PATENT DOCUMENTS

JP 11-305746 11/1999

* cited by examiner

*Primary Examiner*—Victor R. Kostak
(74) *Attorney, Agent, or Firm*—Oblon, Spivak, McClelland, Maier & Neustadt, P.C.

(57) ABSTRACT

A device for outputting video signal includes a magnification alteration processing section that alters the magnification of image data expanded in frame memory in such a manner that the number of pixels in the frame memory and the number of pixels of the display area of a display section are equal. The device further includes a control section for deciding whether or not the magnification alteration processing of the image data by the magnification alteration processing section is to be executed when the image data is being converted into video signals.

13 Claims, 7 Drawing Sheets

|  | NTSC MODE | PAL MODE |
|---|---|---|
| NUMBER OF FRAMES | 30fps | 25fps |
| NUMBER OF FIELDS | 60 | 50 |
| NUMBER OF VERTICAL SCAN LINES | 525 LINES | 625 LINES |
| NUMBER OF EFFECTIVE DISPLAY SCAN LINES | 480 LINES | 576 LINES |
| NUMBER OF HORIZONTAL SCAN CLOCKS | 858 CLOCKS | 864 CLOCKS |
| NUMBER OF EFFECTIVE DISPLAY CLOCKS | 720 CLOCKS | 720 CLOCKS |

MAGNIFICATION ALTERATION PROCESSING METHOD WHICH ACCORDS WITH TYPES OF IMAGE DATA AND IMAGE PROCESSING APPARATUS WHICH USES THE METHOD

FIELD OF THE INVENTION

The present invention relates to a technology for converting image data expanded in frame memory into video signals and outputting these to a display portion. More particularly, this invention relates to a technology that enables the image quality of the displayed image to be improved.

BACKGROUND OF THE INVENTION

Broadly speaking, there are two conventional modes used for creating video signals, the NTSC mode and the PAL mode, when image data expanded in frame memory is output to a display. However, recently, a video signal standard known as "CCIR REC 601 (referred to below as "REC 601")" that can be used for both modes using the same hardware structure has become common.

Figure 3:
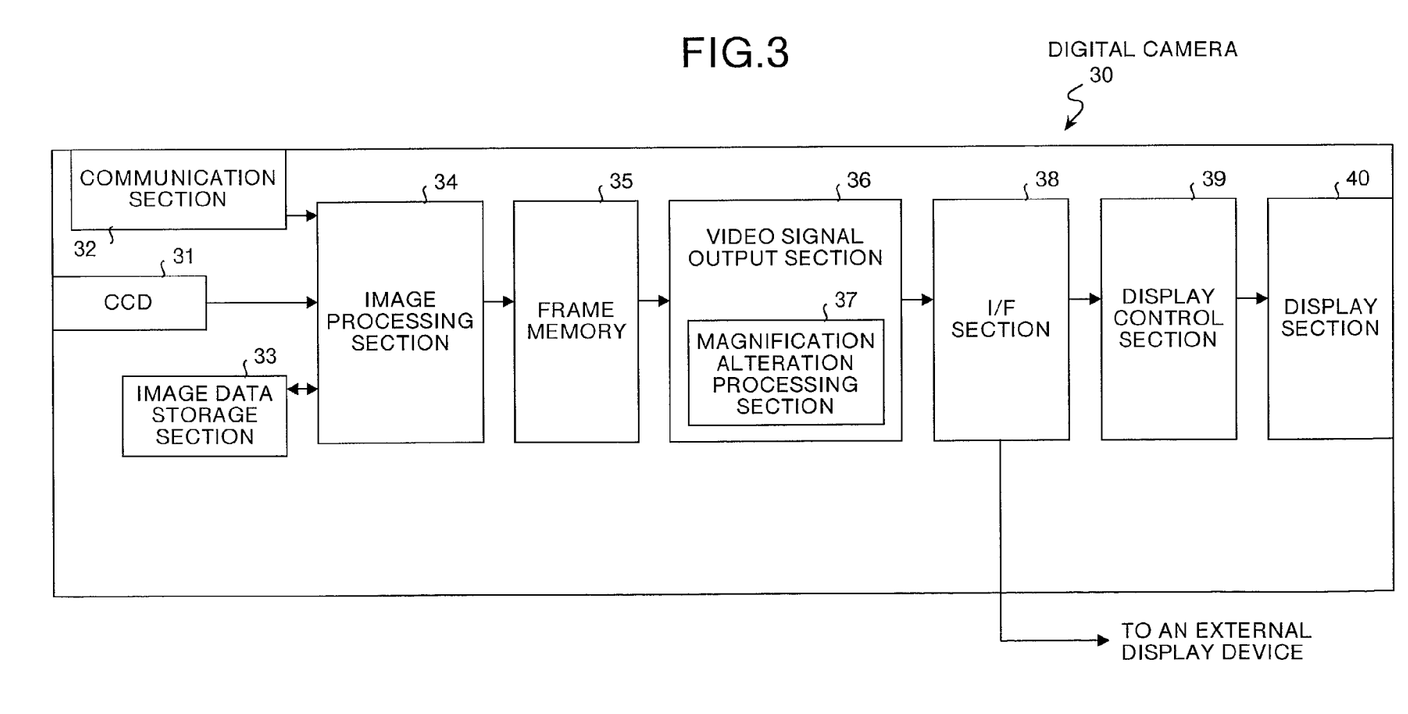
FIG. 3 is a block diagram showing the structure of a digital camera that employs a video signal output device based on REC 601.
Figure 4:
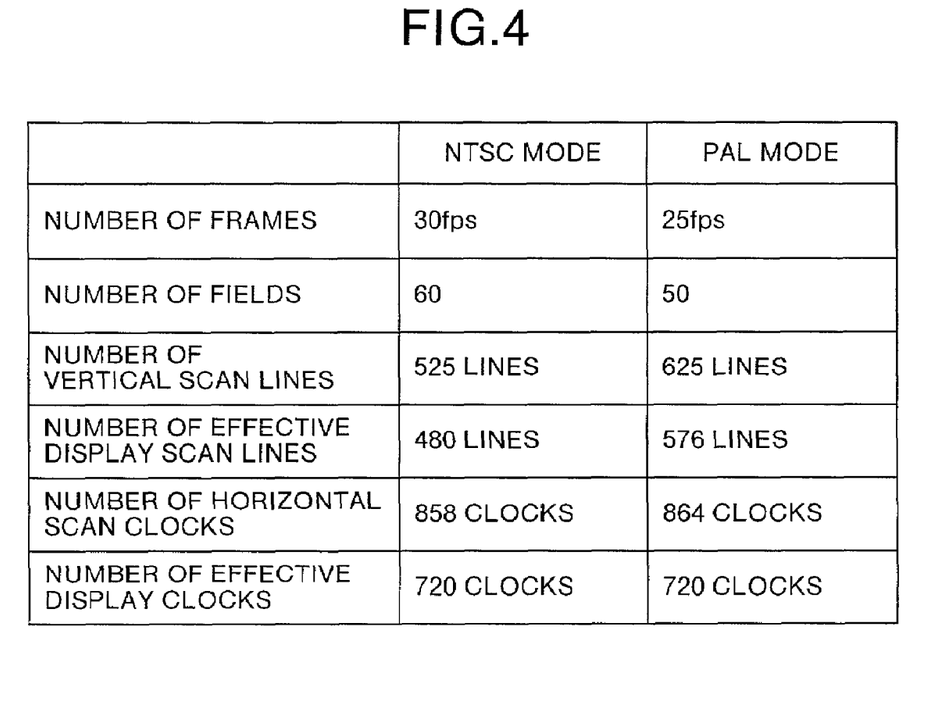
FIG. 4 is a diagram for describing the standards of the NTSC mode and the PAL mode.
Figure 5:
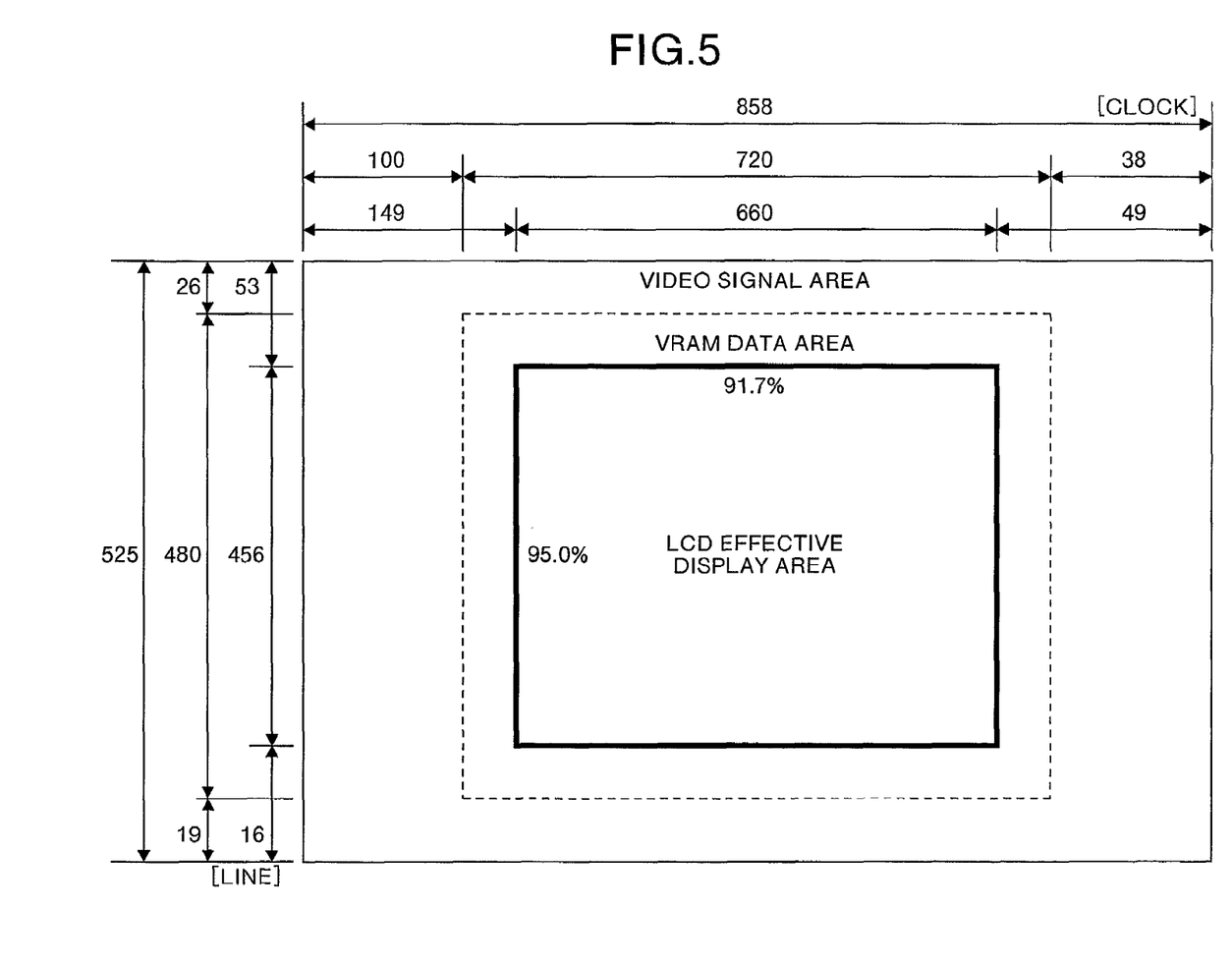
FIG. 5 is a conceptual view showing the video signal timing in the NTSC mode.
Figure 6:
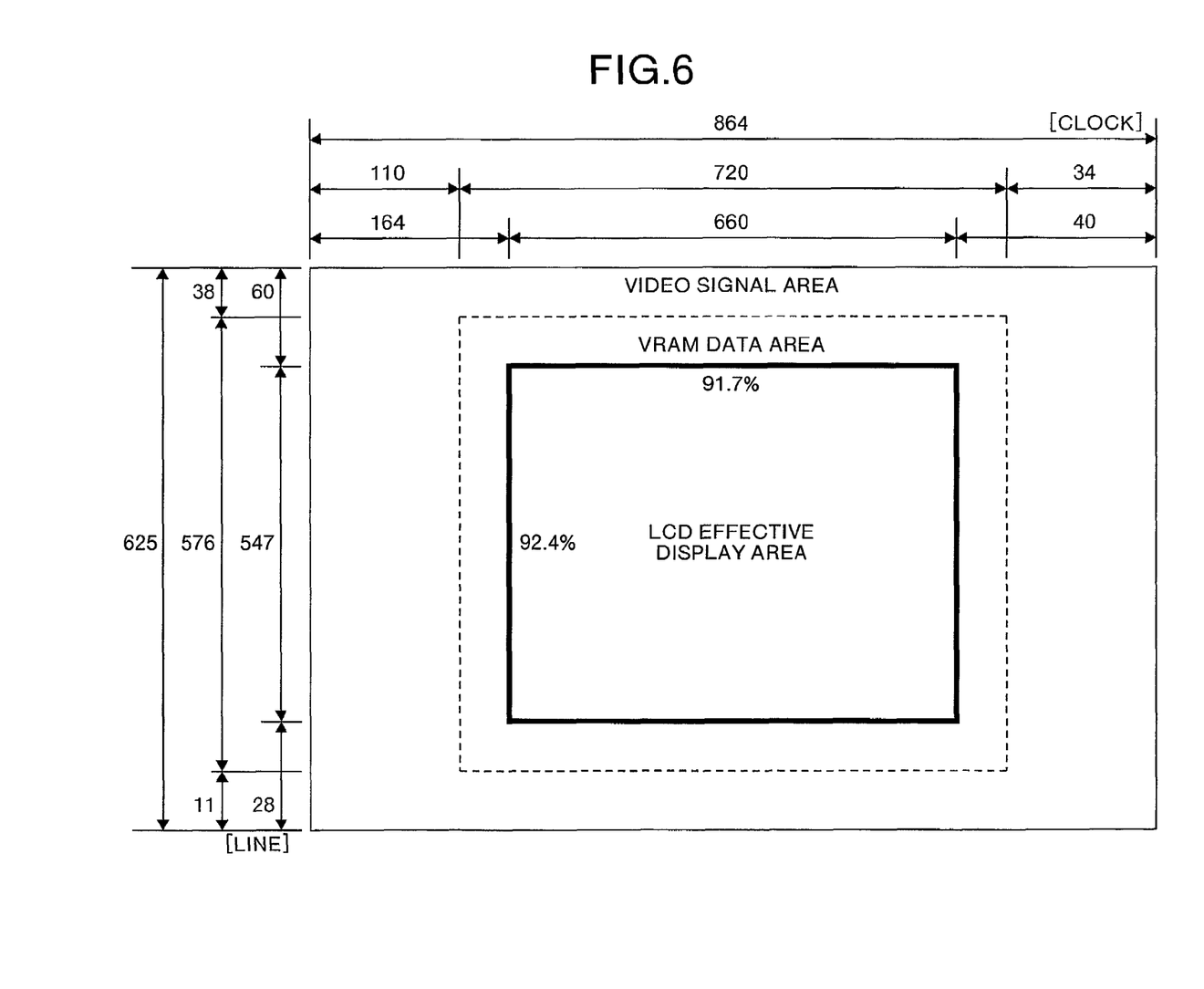
FIG. 6 is a conceptual view showing the video signal timing in the PAL mode.

A description will be given here using FIGS. 3 to 6 of a video signal output device that is based on REC 601. FIG. 3 is a block diagram showing the structure of a digital camera that uses a video signal output device that is based on REC 601. FIG. 4 shows the standards for the NTSC mode and the PAL mode. FIG. 5 shows the concept of the video signal timing in the NTSC mode. FIG. 6 shows the concept of the video signal timing in the PAL mode.

As is shown in FIG. 3, a digital camera 30 is provided with a video signal output section 36 that reads image data expanded in frame memory 35 has 640 pixels in a horizontal direction and 480 pixels in a vertical direction at a timing that corresponds to the video signal, and then adds the appropriate control signals and outputs a video signal. In addition, the video signal output section 36 is also formed with a variable magnification processing section 37 that serves as a video signal output device based on REC 601 by performing magnification alteration processing corresponding to either the NTSC mode or PAL mode on image data that has been expanded in the frame memory 35.

The image data expanded in the frame memory 35 may be image data input using a CCD 31, image data received via a communication section 32, or image data stored in an image data storage section 33. After the image data has undergone predetermined image processing in an image processing section 34, it is expanded in the frame memory 35. Moreover, video signals output from the video signal output section 36 may be displayed on a display section 40 such as an LCD (Liquid Crystal Display) or the like via an I/F section 38 and a display control section 39, or may be displayed on an external display device using a video signal OUT.

Next, a description will be given of the magnification alteration processing in the magnification alteration processing section 37. In REC 601 one pixel that is digitally specified by horizontal scanning and vertical scanning is not formed as a square. The reason for this is because in order to be able to handle both the NTSC mode and PAL mode standards shown in FIG. 4 using the same hardware structure and the same drive frequency, an intermediate frequency (13.5 MHz) is designated in which square pixels are formed in both modes.

Therefore, in the PAL mode, it is necessary to magnify the 480 lines in the vertical direction in the frame memory 35 to 576 effective display scan lines, and it is also necessary to magnify the 640 lines in the horizontal direction to 720 effective display clocks. Namely, when converting into a PAL mode video signal, magnification processing of 9/8 magnification in the horizontal direction and 6/5 magnification in the vertical direction is carried out in the magnification alteration processing section 37. Moreover, in the NTSC mode, it is necessary to magnify 640 lines in the horizontal direction into an effective display clock number of 720 clocks. Namely, when converting into a NTSC mode video signal, magnification processing of 9/8 magnification in the horizontal direction is carried out in the magnification alteration processing section 37.

In this way, in REC 601, magnification processing of 9/8 in the horizontal direction is normally carried out. Because the senses of a person are able to recognize a distortion of between approximately 3 to 5%, the 9/8 magnification processing is a necessary measure. Namely, if the 9/8 magnification processing is not carried out, a distorted image that has been contracted by 88.9% is displayed, which is sufficient distortion to be easily noticeable.

When the magnification alteration processing is performed, because in 9/8 magnification processing 8 pixels are increased to 9 pixels, interpolation magnification alteration processing is performed in which a filtering process is performed for 8 pixels so as to create the 9th pixel. Here, for a natural image such as image data obtained by photography using the CCD 31, because the image has smooth color changes, when the image is displayed after interpolation variable magnification processing, the resolution of the image is decreased, however, to the human eye there does not appear to be any distortion.

Figure 7:
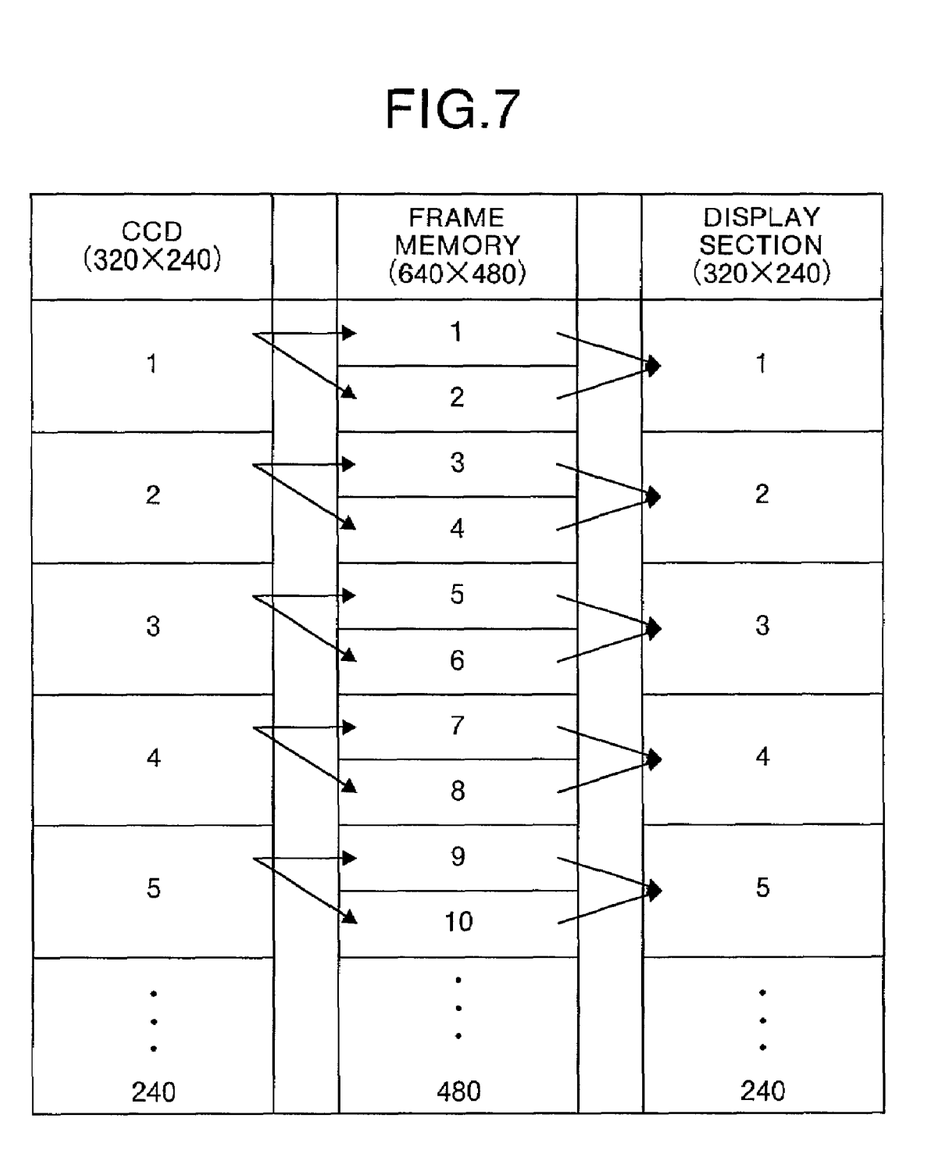
FIG. 7 is a conceptual view showing the lines when an image is displayed by being overwritten in time shifts.

Next, a description will be given while referring to FIG. 7 of the outputting of a video signal by the video signal outputting section 36 to the display section 40 which displays images by overwriting ODD/EVEN fields in time shifts. FIG. 7 shows the concept of the lines when a display is made by overwriting in time shifts.

As is shown in FIG. 7, the CCD 31 inputs image data at a resolution of 320 lines in the horizontal direction and 240 lines in the vertical direction. The image processing section 34 expands the image data by altering the magnification thereof by a factor of 2 in both the vertical and horizontal directions (to a resolution of 640 lines in the horizontal direction by 480 lines in the vertical direction). The display section 40 then overwrites ODD/EVEN fields in time shifts. The result of this is that the image data is displayed at a resolution of 320 lines in the horizontal direction by 240 lines in the vertical direction.

The reason for the CCD 31 inputting the image data at a resolution of 320 horizontally and 240 vertically is because in monitoring mode it is necessary for the transfer load to be light and the display to be made in real time. Furthermore, the reason why the display section 40 overwrites ODD/EVEN fields in time shifts is because the resolution performance of the LCD of approximately 5 inches or less (i.e. the display section 40) used in monitoring mode is approximately 320 in the horizontal direction by 240 in the vertical direction.

However, in the above described conventional technology, various problems have occurred to do with the image quality of displayed images as is described below.

The first problem is that displayed graphic images become blurred. Namely, in the above conventional technology, because magnification alteration processing is always performed for graphic images created purely by data such as E-mail, WEB browsers, set screens, photography mode characters, times, photography numbers, and the like, these graphic images become blurred because of the filtering process.

The second problem is that when natural images are displayed on the NTSC mode display section 40 using PAL mode video signals, the image quality is deteriorated. Namely, because the majority of display sections 40 have the NTSC mode pixel layout (because the 480 lines in the vertical direction are displayed progressively, this comes to approximately 90% of 240 lines—i.e. of half of the 480 lines) due to the demands of the marketplace and the like, the number of lines is absolutely insufficient for video signals in the PAL mode that require 288 lines. Consequently, in the above conventional technology, when natural images are displayed on the NTSC mode display section 40 using PAL mode video signals, although the 5/6 magnification alteration processing in a straight direction is performed in the display section 40, the magnification alteration processing by the magnification alteration processing section 37 does not take into account the magnification alteration processing by the display section 40. Therefore, the image quality is deteriorated due to the repeated magnification alteration processings.

The third problem is that when image data stored in the image data storage section 33 or the like is displayed, it is difficult for this to be displayed on the display section 40 in a short time. Namely, the image data input from the CCD 31 in a high definition (i.e. high pixel number) digital camera, which have become common in recent years, greatly exceeds the number of pixels required for the video signal standard (640 horizontally by 480 vertically). For example, image data having 1280×960 pixels or 1600×1200 pixels is stored in the image data storage section 33 as a main photograph image. If, however, the image data is not to be used as data, but is instead to be displayed on an external display device via the device display section 40 and the video signal OUT, a resolution of 640 in the horizontal direction and 480 in the vertical direction is sufficient. Therefore, in the above conventional technology, the image data of the main photograph image is reduced in the image processing section 34 and expanded in the frame memory 35 and magnification alteration processing is normally performed on the expanded image data in the magnification alteration processing section 37. As a result, it is difficult to display the image data in a short time.

The fourth problem is that it is difficult to confirm framing from an image displayed on the display section 40. Namely, the current situation is that in order for the non-effective range to not be displayed, only 90% or so of the effective display range of the display section 40 is displayed. However, in the above conventional technology, because the magnification alteration processing section 37 always performs the magnification alteration processing to match the number of scan lines of the display section 40, the reality is that it is not possible to display all of the image data expanded in the frame memory. Therefore, it is not possible to display 100% of photographed image data or of an image when monitoring or the like which makes it difficult for framing to be confirmed.

The fifth problem is that when ODD/EVEN fields are overwritten in time shifts, there is a possibility that appropriate overwriting will not be carried out. Namely, when image data is magnified vertically and horizontally by a factor of 2 and expanded in the frame memory 35 as a pair, while it is necessary for this pair to be overwritten in time shifts as a pair once again on the display section 40, there may be a wrong positioning of one line depending on the specifications of the display section 40, in which case the appropriate overwriting is not carried out.

SUMMARY OF THE INVENTION

It is an object of the present invention to provide a method of and device for outputting video signal/s that enable the image quality of a displayed image to be improved. It is another object of this invention to provide a computer readable recording medium that stores a computer program which when executed on a computer easily realizes the method according to the present invention on the computer.

According to one aspect of the present invention, video signal is output by converting image data expanded in frame memory into video signals and outputting the video signals to a display section. In this process, magnification of the image data is altered when converting the image data into the video signals in such a manner that a number of pixels in the frame memory and a number of pixels of a display area of the display section are equal. Moreover, it is decided as to whether or not magnification alteration processing is to be performed on the image data.

According to another aspect of the present invention, video signal is output by converting image data expanded in frame memory into video signals and outputting the video signals to a display section. In this process, which of a first line or a second line of the frame memory the image data should be output from is selected when the image data is being converted into the video signals. Moreover, the image data is sequentially output from the first line or second line of the frame memory in accordance with a result of the above selection.

Other objects and features of this invention will become apparent from the following description with reference to the accompanying drawings.

DESCRIPTION OF THE PREFERRED EMBODIMENTS

Embodiments of the a method of and device for outputting video signal/s, and the recording medium according to the present invention will now be described in detail with reference to the accompanying drawings.

Note that, in the embodiments described below, a description is given of when the present invention is applied to a digital camera, however, the present invention is not limited to this and may be applied to any video device that employs a video signal output device for converting image data expanded in frame memory into video signals and outputting these to a display section. Furthermore, in the present embodiments a description is given of when the present invention is applied to a video signal output device that is based on REC 601, however, the present invention is not limited to this and may be applied to any video signal output device that alters the magnification of image data when converting it into video signals.

In the first embodiment shown below, a description is given of when control is performed to decide whether or not to alter the magnification of image data when converting it into video signals and outputting these. In the second embodiment a description is given of when a decision is made to perform the output in sequence from either the first line or second line in frame memory when converting image data into video signals and outputting these.

Figure 1:
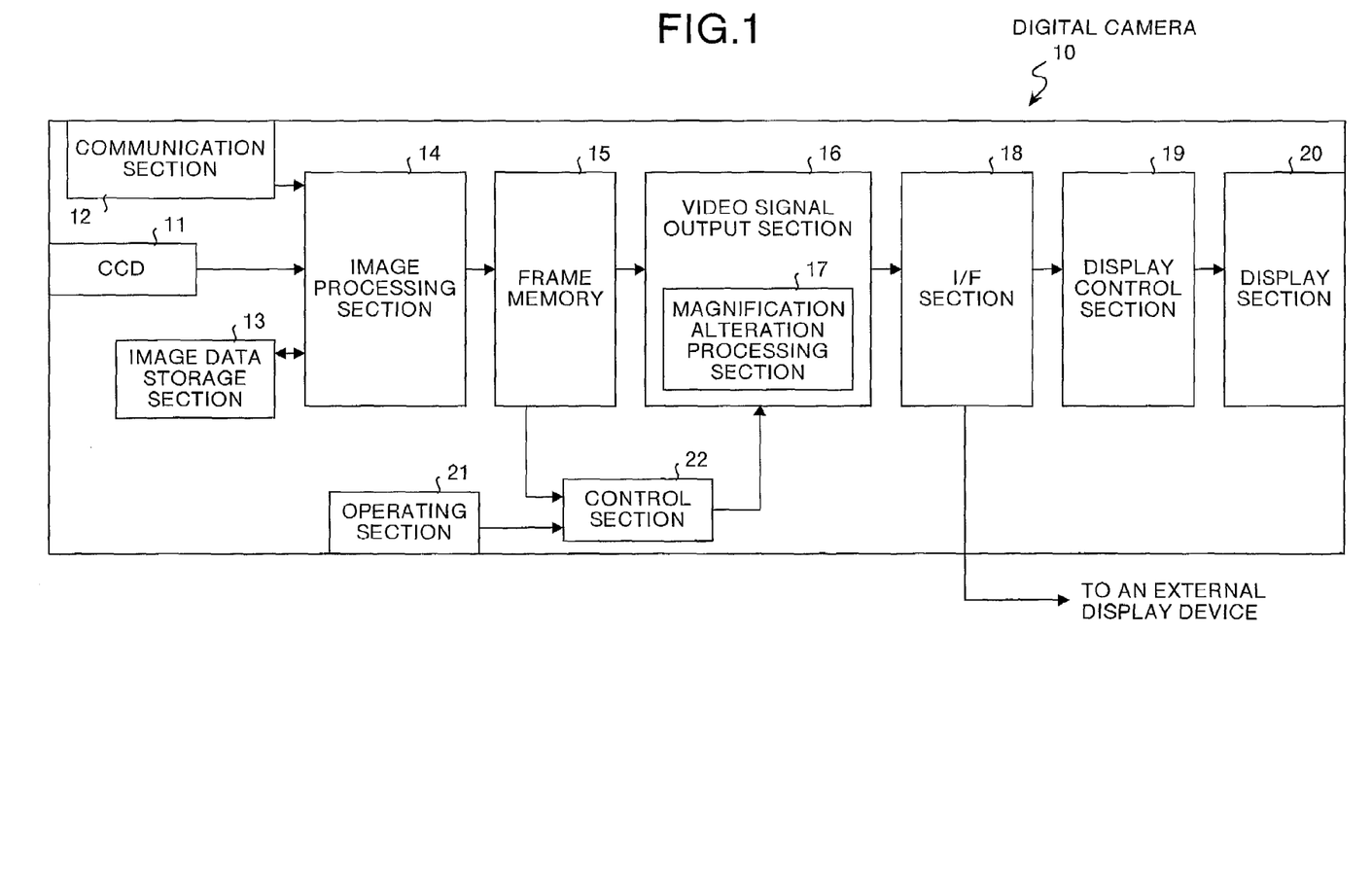
FIG. 1 is a block diagram showing the structure of a digital camera according to the first embodiment of the present invention.

The structure of the digital camera according to the first embodiment will now be described. FIG. 1 is a block diagram showing the structure of the digital camera according to the first embodiment. As is shown in FIG. 1, the digital camera 10 according to the first embodiment is provided with a CCD 11, a communication section 12, an image data storage section 13, an image processing section 14, frame memory 15, a video signal output section 16, a magnification alteration processing section 17, an I/F section 18, a display control section 19, a display section 20, an operating section 21, and a control section 22. The processings of each section will now be described.

The CCD 11 converts a photographed object into electrical signals and inputs a natural image. The CCD 11 is able to input image data at different resolutions through the control of a CCD control section (not shown). For example, when recording a main photograph image, this is input at a high resolution (for example, 1280 in the horizontal direction by 960 in the vertical direction or 1600 in the horizontal direction by 1200 in the vertical direction). On the other hand, when creating and recording thumbnail images of the main photograph image or when displaying an image in monitoring mode, this input is made at a low resolution (for example, 640 in the horizontal direction by 480 in the vertical direction).

Furthermore, when creating and recording thumbnail images of the main photograph image or when displaying an image in monitoring mode, the CCD 11 is able to input image data in such a manner that the number of pixels of the image data is equivalent to the number of pixels of the display area of the display section 20. Namely, the image data is input as image data that has already undergone magnification alteration processing in the magnification alteration processing section 17. As a result, magnification alteration processing by the magnification alteration processing section 17 is not required and the immediate display of an image is made possible.

The communication section 12 performs the transmitting and receiving of image data with external terminals. Namely, in the same way as with a PDA (Personal Digital Assistant) the communication section 12 transmits and receives data of graphic images created purely by data such as that of E-mail or WEB browsers.

The image data storage section 13 stores image data. Specifically, the image data storage section 13 stores thumbnail images and main photograph images input from the CCD 11 and graphic images received by the communication section 12, as well as image data created by the image processing section 14 and thumbnail images input by the CCD 11 in such a manner that the number of pixels of the image data equals the number of scan lines of the display section 20. Note that the image data storage section 13 is able to store the respective groups of image data after adding information thereto such as whether the image is a natural image or a graphic image or whether the image has already undergone a change in magnification, or the like.

The image processing section 14 performs various types of image processing on image data stored in the image data storage section 13 or on image data expanded in the frame memory 15. For example, the image data may be enlarged or reduced so as to match the resolution of the frame memory 15 (640 in the horizontal direction by 480 in the vertical direction), or a thumbnail image of the photograph main image may be created, or an OSD (On Screen Display) of a graphic image such as the time, photograph number, or photography mode displayed on top of a natural image may be created.

The frame memory 15 is memory for expanding the image data and, in the first embodiment, is provided with 640 pixels in the horizontal direction and 480 pixels in the vertical direction. Note that if graphic images are to be displayed on top of natural images, it is possible to provide a separate frame memory for the natural images and a separate frame memory for the graphic images. Furthermore, it is also possible to provide in advance frame memory having number of pixels equal to the number of pixels of the display range of the display section 20 and to display image data that does not undergo magnification alteration processing in the magnification alteration processing section 17 on the display section 20 at a magnification of 100%.

The video signal output section 16 reads image data expanded in the frame memory 15 at a timing corresponding to the video signal, then adds the appropriate control signals and outputs video signals. Note that the video signal output section 16 outputs the image data in sequence starting from the first line in the frame memory 15.

The magnification alteration processing section 17 alters the magnification of image data when the video signal output section 16 is converting image data into video signals in such a manner that the number of pixels in the frame memory 15 is the same as the number of pixels of the display area of the display section 20. Specifically, based on REC 601, when converting image data into video signals in NTSC mode, the magnification alteration processing section 17 alters the magnification by 9/8 in the horizontal direction and when converting image data into video signals in PAL mode, the magnification alteration processing section 17 alters the magnification by 9/8 in the horizontal direction and by 6/5 in the vertical direction.

In normal mode, the magnification alteration processing section 17 performs the magnification alteration processing by carrying out a filtering process on the image data. When the display section 20 displays image data by performing 5/6 magnification alteration processing in the vertical direction on video signals in PAL mode so as to delete the data of the vertical lines in predetermined positions (i.e. when PAL mode video signals are used to display an image on an NTSC mode display section), the 6/5 magnification alteration processing in the vertical direction is performed by adding data to the same positions as the vertical lines deleted by the display section 20.

As a result of this type of magnification alteration processing, because the added lines and the deleted lines are the same lines, the image data expanded in the frame memory 15 and the image displayed on the display section 20 end up being essentially the same image. Moreover, even when PAL mode video signals are used to display an image on an NTSC mode display section, it is possible for the image to be displayed with less deterioration in the image quality.

The I/F section 18 is an interface for outputting video signals output from the video signal output section 17 to the display section 20 of this device or to an external display device. The display control section 19 controls the display section 20. The display section 20 displays video signals output from the video signal output section 17.

The operating section 21 is an operating panel for instructing the operations of the digital camera 10. For example, instructions are given relating to the input of image data by the CCD 11, the sending and receiving of image data by the communication section 12, the storage of image data by the image data storage section 13, and the switching of modes such as into or out of monitoring mode. It is also possible to use the operating section 21 to instruct the selection of whether or not the magnification alteration processing (i.e. not to execute the 9/8 magnification alteration processing in the horizontal direction and the 6/5 magnification alteration processing in the vertical direction when converting into PAL mode video signals) is to be executed by the magnification alteration processing section 17.

The control section 22 controls whether or not magnification alteration processing is executed on the image data by the magnification alteration processing section 17 based on instructions from the operating section 21 and the content of the image data expanded in the frame memory 15. Specifically, when the image data contents are a natural image, the control section 22 performs control in such a manner that magnification alteration processing is performed, while when the image data contents are a graphic image, the control section 22 performs control in such a manner that the magnification processing is not performed. As a result, it is possible to display a natural image without any deformation or any sense of distortion and to display a graphic image without any blurring.

When the display section 20 is displaying a graphic image superposed on top of a natural image, the control section 22 performs the control for executing the magnification alteration processing on the image data of the natural image and also performs control so that the magnification alteration processing is not performed on the image data of the graphic image. As a result, it is possible to display a natural image and a graphic image at the same time without any blurring or any sense of distortion.

Moreover, the control section 22 performs control in such a manner that the magnification alteration processing is not performed when the number of pixels of the image data expanded in the frame memory 15 is equal to the number of pixels of the display area of the display section 20. For example, in cases such as when a thumbnail image that has already undergone magnification alteration processing is expanded in frame memory 15, or when image data input from the CCD 11 that has already undergone magnification alteration processing during monitoring is expanded in the frame memory 15. As a result, it is possible to display a thumbnail image or an image during monitoring at an extremely fast display speed while preventing the image from being distorted.

Furthermore, when non execution of the magnification alteration processing has been selected via the operating section 21, the control section 22 performs the control for not executing the 9/8 magnification alteration processing in the horizontal direction and the 6/5 magnification alteration processing in the vertical direction when converting to PAL mode video signals. As a result, it is possible to display image data expanded in the frame memory at 100% magnification (i.e. in a display of 640×480 pixels in 720×576 scan lines). Note that, in this case, the displayed image does appear deformed, however, it is effective in cases such as when confirmation of the framing of a photograph image is desired. In addition, because no special video signal standard is used, it can be achieved simply on a normal system.

A second embodiment according to the present invention will now be described. The second embodiments assumes a case when a choice is made as to which of either the first line or second line of frame memory the sequential outputting of the video signals should be started from when image data is converted into video signals and output. Note that because the structure of the digital camera according to the second embodiment is the same as that of the digital camera shown in FIG. 1, a detailed description thereof is omitted here.

The operating section 21 in the second embodiment chooses which of either the first line or second line of frame memory 15 the sequential outputting of the image data expanded in the frame memory 15 should be started from and gives the appropriate instruction. The control section 22 receives the instruction for either the first line or the second line and passes the instruction on to the video signal output section 16.

When the instruction received is for the first line, the video signal output section 16 sequentially outputs the image data expanded in the frame memory 15 starting from the first line of the frame memory 15. When the instruction received is for the second line, the video signal output section 16 sequentially outputs the image data starting from the second line of the frame memory 15.

The display section 20 overlaps in time shifts the data of two consecutive lines output from the video signal output section 16 and displays this data. Namely, ODD/EVEN fields are overlapped in time shifts and displayed.

A description will be given using FIG. 2 of the concept of the lines when the time shifted overlapping and display are for image data output that starts from the second line. Note that the concept of the lines when the time shifted overlapping and display are for image data output that starts from the first line is the same as is shown in FIG. 7 and a detailed description thereof is omitted here.

Figure 2:
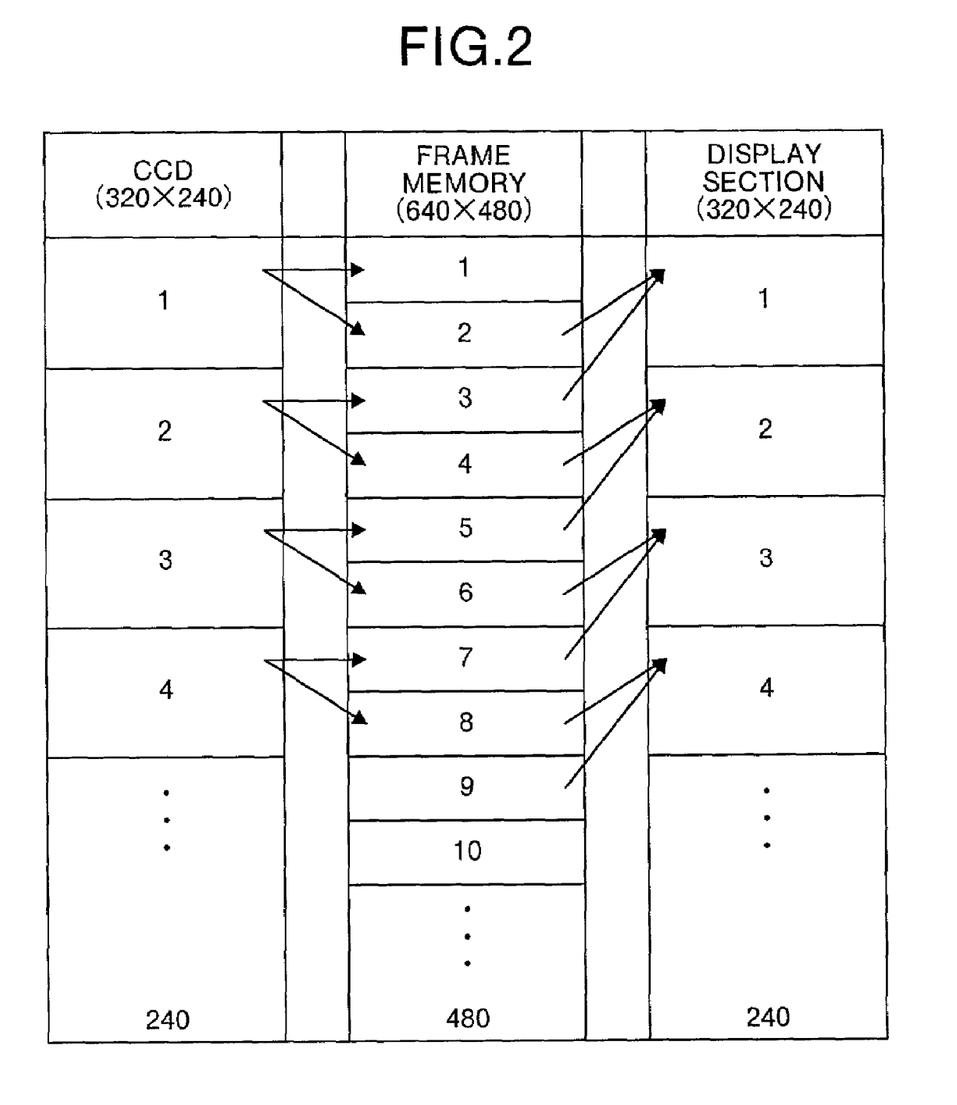
FIG. 2 is a conceptual view showing the lines when an image is displayed by overwriting in time shifts when the output starts from the second line.

FIG. 2 is a conceptual view of the lines when an image is displayed by overwriting in time shifts when the output starts from the second line. As is shown in FIG. 2, the CCD 11 inputs image data at a resolution of 320 in the horizontal direction by 240 in the vertical direction. The image processing section 14 magnifies the image data by a factor of two both vertically and horizontally (to a resolution of 640 in the horizontal direction by 480 in the vertical direction). The display section 20 overwrites ODD/EVEN fields in time shifts so as to display the image, however, the video signal output section 16 outputs the image data starting from the second line of the frame memory 15.

In this case, because an image is displayed in the display section 20 in the same state as when a filtering process that takes the average of two adjacent lines of the CCD 11 is performed, in comparison with the case shown in FIG. 6, the resolution in the vertical direction is reduced by half. When a natural image is being displayed during monitoring, because the break between line units is clearly visible if the resolution is high, the usual demand is that the resolution be intentionally lowered for the display, however, if the choice is made as described above, it is possible to display a smooth image without reducing the resolution when displaying a natural image.

Note that the adding of a filtering processing section capable of ON/OFF control in order to change the resolution leads to the creation of new problems such as the increased costs and increased power consumption that accompany the addition of a processing circuit, however, by choosing which of either the first line or second line of frame memory the sequential outputting should be started from when converting image data into video signals and outputting these in the manner described above, the resolution can be changed with ease.

In contrast, when displaying a graphic image, a high resolution display is demanded. Namely, as is shown in FIG. 2, because it is not possible to display a clear image at a high resolution if a line is positioned improperly and the proper pair is not formed, it is absolutely necessary that the original pair be overwritten, as is shown in FIG. 6. In this case, by choosing which of either the first line or second line of frame memory the sequential outputting should be started from when converting image data into video signals and outputting these in the manner described above, it is possible to always perform the appropriate overwriting and display a smooth image.

In addition, when the number of lines of the image data expanded in the frame memory 15 is an odd number as a result of trimming or the like, the video signal output section 16 adds or deletes image data in such a manner that the number of lines is made an even number. Specifically, the first line of the image data or the data of the last line is output as an addition to the top end or the bottom end of the image data respectively, or the first line of the image data or the data of the last line is deleted and then the image data output.

As a result of this addition or deletion, the data of a line that does not form a pair in the ODD/EVEN field can be prevented from being overwritten with a pack color such as black, blue, or white and displayed, and it is possible to prevent such deteriorations in the image quality as a natural image being displayed in colors that are different from the original image.

It is possible to realize the video signal output method described in the above first and second embodiments by executing a computer program prepared in advance on a computer such as a personal computer or workstation. This computer program is recorded on a recording medium capable of being read by a computer such as a hard disk, a floppy disk, a CD-ROM, an MO, a DVD, or the like and is executed by being read from the recording medium by the computer. In addition, this computer program can be distributed via the above described recording medium or via a network such as the Internet.

As has been described above, according to the present invention, the effect is achieved that it is possible to obtain a video signal output device capable of improving the image quality of a displayed image.

Moreover, the effect is achieved that it is possible to obtain a video signal output device capable of improving the image quality of a displayed image while basing the operation on the "CCIR-REC 601" video signal standard.

Furthermore, the effect is achieved that, in comparison with simple magnification alteration, it is possible to obtain a video signal output device capable of displaying an image in which there are hardly any changes.

Moreover, effect is achieved that it is possible to obtain a video signal output device capable of displaying images without any deterioration in image quality even when PAL mode video signal images are displayed on an NTSC version display section.

Furthermore, the effect is achieved that it is possible to obtain a video signal output device capable of displaying a natural image without any deformation or distortion and of displaying a graphic image without any blurring.

Moreover, the effect is achieved that it is possible to obtain a video signal output device capable of simultaneously displaying a natural image and a graphic image without any distortion and without any blurring.

Furthermore, the effect is achieved that it is possible to obtain a video signal output device capable of displaying images at a rapid display speed while preventing the images from being distorted.

Moreover, the effect is achieved that it is possible to obtain a video signal output device capable of, for example, storing thumbnail images or the like in a state of altered magnification and to display the images at a rapid display speed while preventing them from being distorted.

Furthermore, the effect is achieved that it is possible to obtain a video signal output device capable of displaying images at a rapid display speed while preventing the images from being distorted even when monitoring.

Moreover, the effect is achieved that a video signal output device capable of displaying image data expanded in the frame memory at 100% is obtained.

Furthermore, the effect is achieved that a video signal output device capable of always performing the appropriate overwriting for graphic images and also capable of changing the resolution of displayed natural images with ease is obtained.

Moreover, the effect is achieved that a video signal output device is obtained that is capable of preventing deteriorations in image quality that are caused by a line that is not part of a pair being overwritten with a pack color and displayed.

Furthermore, the effect is achieved that a video signal output device is obtained that is capable of preventing deteriorations in image quality that are caused by a line that is not part of a pair being overwritten with a pack color and displayed.

In addition, the effect is achieved that a recording medium is obtained that is capable of realizing on a computer the operation of any one of the fourteenth to twenty sixth aspects of the present invention.

The present document incorporates by reference the entire contents of Japanese priority documents, 2000-267106 filed in Japan on Sep. 4, 2000, 2000-269412 filed in Japan on Sep. 5, 2000 and 2001-062609 filed in Japan on Mar. 6, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device for outputting video signal by converting image data input in frame memory into video signals and outputting the video signals to a display section, said device comprising:

an image data obtaining unit which obtains an input data from an image pickup unit when the image data input is a natural image;

a magnification alteration unit which alters a magnification of the image data;

a control unit which controls whether or not magnification alteration should be performed, using the magnification alteration unit to alter the image data in accordance with types of the image data input; and an input unit which inputs image data in such a manner that the number of pixels of the image data is equal to the number of pixels of the display area of said display section, and expanding the input image data in said frame memory.

2. The device according to claim 1, wherein, when contents of the image data comprise a natural image, said control unit performs control in such a manner that magnification alteration processing is performed on the image data, and when contents of the image data comprise a graphic image, said control unit performs control in such a manner that magnification processing is not performed on the image data, wherein said control unit further performs control in accordance with the types of the image data.

3. The device according to claim 1, wherein, when said display section displays a graphic image superposed on top of a natural image, said control unit performs control in such a manner that magnification alteration processing is performed on the image data of the natural image, and also performs control in such a manner that magnification alteration processing is not performed on the image data of the graphic image.

4. The device according to claim 1, wherein, when the number of pixels of the image data expanded in said frame memory is equal to the number of pixels of the display area of said display section, said control unit performs control in such a manner that the magnification alteration processing is not performed on the image data.

5. A method of outputting video signal by converting image data input in frame memory into video signals and outputting the video signals to a display section, the method comprising the steps of:

obtaining an input data from an image pickup unit when the image data input is a natural image;

altering a magnification of the image data;

controlling a decision as to whether or not magnification alteration should be performed in accordance with types of the image data input; and inputting image data in such a manner that the number of pixels of the image data is equal to the number of pixels of the display area of said display section, and expanding the input image data in said frame memory.

6. The method according to claim 5, wherein, when said display section displays image data by performing 5/5 magnification alteration processing in the vertical direction on video signals in PAL mode in which processing data of a vertical line at a predetermined position is deleted, the 6/5 magnification alteration processing in the vertical direction is performed in the magnification alteration step by data being added to the same position as the deleted vertical line, and a magnification alteration unit is set to 6/5, in expectation of a horizontal line to be deleted at said display section, by adding the data to the horizontal line to be deleted.

7. The method according to claim 5, wherein, when contents of the image data comprise a natural image, control is performed in the control step in such a manner that magnification alteration processing is performed on the image data, and when contents of the image data comprise a graphic image, control is performed in the control step in such a manner that magnification processing is not performed on the image data, wherein said control is performed in accordance with the types of the image data.

8. The method according to claim 5, wherein, when said display section displays a graphic image superposed on top of a natural image, control is performed in the control step in such a manner that magnification alteration processing is performed on the image data of the natural image, and control is also performed in such a manner that magnification alteration processing is not performed on the image data of the graphic image.

9. The method according to claim 5, wherein, when the number of pixels of the image data expanded in said frame memory is equal to the number of pixels of the display area of said display section, control is performed in the control step in such a manner that the magnification alteration processing is not performed on the image data.

10. The method according to claim 9, further comprising the step of storing in advance image data whose pixel number is the same as the number of pixels of the display area of said display section, and expanding the stored image data in said frame memory.

11. The method according to claim 5, further comprising the step of choosing whether or not to execute the magnification alteration processing in the magnification alteration processing step, and when the choice of not executing the magnification alteration processing is made in the choosing step, control is performed in the control step in such a manner that the 9/8 magnification processing in the horizontal direction and the 6/5 magnification processing in the vertical direction are not performed when the image data is being converted into PAL mode video signals.

12. A computer readable medium for storing instructions, which when executed on a computer, causes the computer to perform a method of outputting different types of video signals by converting image data input in frame memory into said video signals and outputting the video signals to a display section, the method comprising the steps of:

obtaining an input data from an image pickup unit when the image data input is a natural image;

altering a magnification of the image data;

controlling a decision as to whether or not magnification alteration should be performed in accordance with types of the image data input; and inputting image data in such a manner that the number of pixels of the image data is equal to the number of pixels of the display area of said display section, and expanding the input image data in said frame memory.

13. A device for outputting video signal by converting image data input in frame memory into video signals and outputting the video signals to a display section, said device comprising:

an image data obtaining unit which obtains an input data from a communication unit when the image data input is a graphic image;

a magnification alteration unit which alters a magnification of the image data;

a control unit which controls whether or not magnification alteration should be performed using the magnification alteration unit to alter the image data in accordance with types of the image data input; and an input unit which inputs image data in such a manner that the number of pixels of the image data is equal to the number of pixels of the display area of said display section, and expanding the input image data in said frame memory.

* * * * *